(12) United States Patent
Langner

(10) Patent No.: US 8,271,847 B2
(45) Date of Patent: Sep. 18, 2012

(54) METHOD AND APPARATUS FOR N+1 PACKET LEVEL MESH PROTECTION

(75) Inventor: Paul Langner, Richardson, TX (US)

(73) Assignee: Agere Systems Inc., Allentown, PA (US)

( * ) Notice: Subject to any disclaimer, the term of this patent is extended or adjusted under 35 U.S.C. 154(b) by 383 days.

(21) Appl. No.: 12/565,453

(22) Filed: Sep. 23, 2009

(65) Prior Publication Data

US 2010/0017687 A1    Jan. 21, 2010

Related U.S. Application Data

(62) Division of application No. 11/239,273, filed on Sep. 29, 2005.

(51) Int. Cl.
*G06F 11/00* (2006.01)
(52) U.S. Cl. .......................... 714/752; 714/776
(58) Field of Classification Search .................. 714/752, 714/776
See application file for complete search history.

(56) References Cited

U.S. PATENT DOCUMENTS

| | | | |
|---|---|---|---|
| 5,479,416 A | 12/1995 | Snodgrass et al. | |
| 5,870,412 A * | 2/1999 | Schuster et al. | 714/752 |
| 6,243,846 B1 * | 6/2001 | Schuster et al. | 714/776 |
| 6,477,185 B1 | 11/2002 | Komi et al. | |
| 6,487,215 B1 | 11/2002 | Watanabe et al. | |
| 6,829,741 B1 * | 12/2004 | Khansari et al. | 714/755 |
| 7,230,935 B2 | 6/2007 | Proctor et al. | |
| 2004/0181732 A1 * | 9/2004 | McEwen et al. | 714/755 |
| 2006/0109805 A1 | 5/2006 | Vadakital et al. | |
| 2008/0320358 A1 * | 12/2008 | Pandel et al. | 714/752 |
| 2010/0050057 A1 * | 2/2010 | Luby | 714/776 |
| 2011/0131474 A1 * | 6/2011 | Pandel et al. | 714/776 |

* cited by examiner

*Primary Examiner* — Marc Duncan
(74) *Attorney, Agent, or Firm* — Ryan, Mason & Lewis, LLP

(57) ABSTRACT

Methods and apparatus are provided for N+1 packet level mesh protection. An error correction encoding method is provided that assembles M-T data packets; appends a sequence number and a payload integrity check to each of the M-T data packets; and creates T protection packets having the sequence number and payload integrity check, wherein a payload for each of the T protection packets are formed from corresponding symbols in the M-T data packets. An error correction decoding method is also provided that receives a plurality of error-free packets and one or more packets having an error; and reconstructs the one or more packets having an error by applying block erasure decoding to said plurality of error-free packets, whereby one packet having an error can be reconstructed for each protection packet used to encode the received packets.

6 Claims, 4 Drawing Sheets

METHOD AND APPARATUS FOR N+1 PACKET LEVEL MESH PROTECTION

CROSS-REFERENCE TO RELATED APPLICATIONS

This application is a divisional of U.S. patent application Ser. No. 11/239,273, filed Sep. 29, 2005, incorporated by reference herein.

FIELD OF THE INVENTION

The present invention relates generally to failure protection techniques (redundancy) for a packet network, and more particularly, to methods and apparatus for N+1 packet level failure protection techniques.

BACKGROUND OF THE INVENTION

Failure and error protection techniques are used in a number of communication and storage systems. Failure protection is used to mask the failure of an individual component, by providing other means of regenerating the data stream that was handled by the failed component. Error protection, on the other hand, is typically used to mask bursts of errors caused by noise in the transmission system. For example, error correction codes add one or more redundant bits to a digital stream prior to transmission or storage, so that a decoder can detect and possibly correct errors caused by noise or other interference. In a communication network, for example, failure protection typically involves sending a duplicate copy of the data being protected to the receiver. The receiver then selects the "best" copy of the signal. Unfortunately, this level of redundancy results in 50% of the network bandwidth being wasted. As well, the system does not typically take advantage of the duplicate signal to correct individual errors in the active, or working signal.

Thus, a number of techniques have been proposed or suggested for reducing the bandwidth required for failure protection. One proposed technique employs sharing schemes, where a reserve channel is kept open for a number of working channels. When one of these working channels fails, the reserve channel is invoked and protection occurs. Bidirectional Line Switched Ring (BLSR), One for N (1:N) and Resilient Packet Ring (RPR) fall into this category Unfortunately, the signaling and operational logistics required to implement shared protection across a real network are prohibitive, and again none of these techniques are able to offer real-time error correction on their own, which relegates these shared protection schemes to either degenerate cases, such as N+1 connections all going between two points with no intermediate nodes, individual rings, or to background optical restoration schemes in which the network is reconfigured in non-real time to deal with network outages, and instead relies on a simple high-level scheme like 1+1 protection to deal with real-time protection against failures.

A need therefore exists for methods and apparatus for improved failure correction schemes that are: bandwidth efficient, simple to implement, operational across any network, and utilize failure protection information to also correct transmission errors.

SUMMARY OF THE INVENTION

Generally, methods and apparatus are provided for N+1 packet level mesh protection. According to one aspect of the invention, an error correction encoding method is provided that assembles M-T data packets; appends a sequence number and a payload integrity check to each of the M-T data packets; and creates T protection packets having the sequence number and payload integrity check, wherein a payload for each of the T protection packets are formed from corresponding symbols in the M-T data packets. In the case of a single protection packet, the payload is equal to a symbol-wise Galois field addition of the corresponding symbols in the M-1 packets. The payload integrity check can be, for example, a cyclic redundancy check or an error correcting code. In one exemplary implementation, an error correction encoder is provided for encoding message bytes, $m_0$ through $m_{N-1}$, to generate a codeword that includes the message bytes, $m_0$ through $m_{N-1}$, and a check byte, $r_0$. The error correction encoder comprises a linear feedback shift register having a flip-flop $D_0$ to generate the check byte after shifting the message bytes, $m_0$ through $m_{N-1}$, through the linear feedback shift register.

According to another aspect of the invention, an error correction decoding method is provided that receives a plurality of error-free packets and one or more packets having an error; and reconstructs the one or more packets having an error by applying a symbol-wise Galois field addition to the plurality of error-free packets, whereby one packet having an error can be reconstructed for each protection packet used to encode the received packets. In one exemplary implementation, a GF(256) error correction decoder is provided for decoding a codeword that includes message bytes, $m_0$ through $m_{N-1}$, and a check byte, $r_0$. The error correction decoder comprises a linear feedback shift register having a flip-flop $D_0$ to generate an error byte based on a remainder after shifting the message bytes, $m_0$ through $m_{N-1}$, and the check byte, $r_0$, through the linear feedback shift register. Since GF(256) is a binary extension field, i.e. $GF(2^n)$, the addition operation is a byte-wise exclusive OR, or Bit Interleaved Parity (BIP). In the case of a single protection packet, the error byte is the remainder for a T=1 protection packet.

A more complete understanding of the present invention, as well as further features and advantages of the present invention, will be obtained by reference to the following detailed description and drawings.

DETAILED DESCRIPTION

Figure 1:
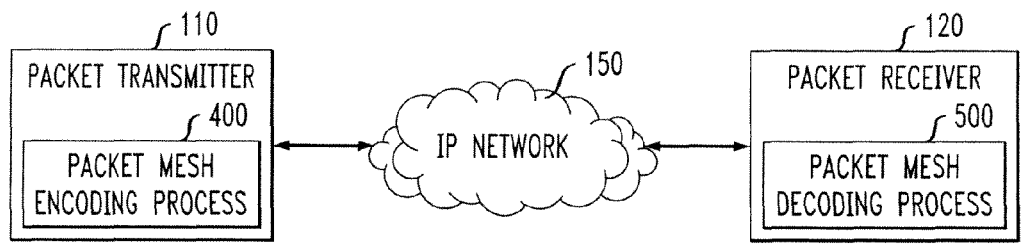
FIG. 1 illustrates an exemplary packet network environment in which the present invention can operate.

The present invention provides methods and apparatus for N+1 packet level mesh protection. Generally, the disclosed failure protection techniques are based on error correction, where for every working signal transmitted, some amount of redundancy is employed. FIG. 1 is a block diagram of an exemplary packet network environment in which the present invention can operate. As shown in FIG. 1, two or more endpoints, such as a packet transmitter 110 and a packet receiver 120, attempt to establish a connection over a network 150, such as an IP network. The packet transmitter 110 employs a packet mesh encoding process 400 incorporating features of the present invention and discussed below in conjunction with FIG. 4. The packet receiver 120 employs a packet mesh decoding process 500 incorporating features of the present invention and discussed below in conjunction with FIG. 5. It is noted that the network 150 may be embodied as any combination of public or private, wired or wireless networks, as would be apparent to a person of ordinary skill in the art.

Erasure Coding

Erasure coding is a form of block error correction that is similar to normal error correction, except in the case of erasure coding, the user knows the location of the errors. In normal block error coding, for a block of N bytes, 2T check symbols must be added for every T symbols that are desired to be "fixable" within the block. In erasure coding, because the location of the errors are known, only T check symbols need to be added for every T symbols to be corrected in the block. It is noted from an information theory perspective, that if the location of the error is not known, one symbol must be employed to indicate the location of the error, and another symbol must be employed to indicate the error value.

Thus, in an N+1 mesh, T equals one, and this check symbol would be calculated from N symbols of the working signals.

Encoder

Given a systematic code of length N, the final message c(x) can be expressed as:

$$c(x) = x^T m(x) - r(x) = q(x) g(x) \quad (1)$$

where r(x) is the remainder after dividing the shifted message polynomial m(x) by the generator polynomial g(x), and q(x) is the quotient. Assuming a Galois Field, GF (256), i.e., byte based coding, and as per Reed and Solomon's theory:

$$g(x) = \prod_{i=0}^{T} (x - \alpha^{(i=\mathit{Offset})}) \quad (2)$$

and $\alpha^n$ are consecutive elements of GF(256). Thus, when the offset equals 0 and T equals 1:

$$g(x) = x - \alpha^0 \quad (3)$$

Figure 2:
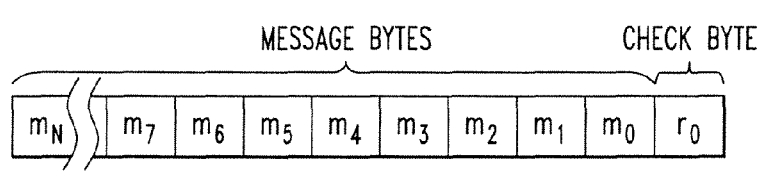
FIG. 2 illustrates an exemplary encoded codeword.
Figure 3:
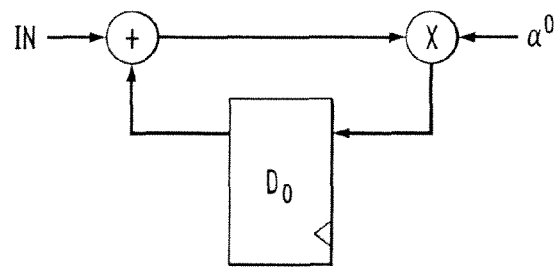
FIG. 3 is a block diagram illustrating an exemplary implementation of division by a generator polynomial to compute a check byte using a linear feedback shift register (LFSR)

Thus, for GF(256) with a single byte check, the codeword 200 would consist of the original message bytes, $m_0$ through $m_{N-1}$, followed by one check byte, $r_0$, as shown in FIG. 2, where N equals 255. Thus, in a GF(256), T=1 erasure code, a single check byte can correct any errored byte in a block of up to 255 bytes. FIG. 3 is a block diagram illustrating an exemplary implementation of equation (3) using a linear feedback shift register (LFSR) 300. In the implementation of FIG. 3, the remainder $r_0$ is the check byte, which is the value of the octal flip-flop $D_0$ after shifting all of the message bytes through the LFSR 300, finishing with $m_0$. It is noted that for any Galois field, $\alpha^0$ is always the multiplicative identity element, or the unity. Thus, the remainder $r_0$ is, in fact, the bytewise XOR of the N signal bytes.

Decoder

Typically, in erasure decoding, the syndrome polynomial is calculated that can then be used to calculate the error values. Since there is a 1:1 relationship between errors and the remainder polynomial used as an input to syndrome calculations, it is often just implemented as a look-up table, and it is only for large syndrome polynomials that algebraic methods must be employed.

Consider that the first step in the erasure decoding process is to calculate the remainder polynomial. This is done in the same fashion as the generator block 300, except now the entire received codeword $c_R(x)$ is divided by g(x). The remainder polynomial is thus:

$$r(x) = c_R(x) | g(x) \quad (4)$$

It is given that $c_R(x) + c(x) = e(x)$, where e(x) is the error polynomial. Since this remainder is calculated by dividing the received codeword by the generator polynomial, the same circuit as shown in FIG. 3 can be used. Thus the remainder r(x) can be expressed as the symbol-wise addition of all the bytes in the code block, i.e., the sum of all the symbols of the received codeword. For GF(256) T=1 codes, given that the check byte in the original codeword was the sum of all the previous bytes, that A+A=0 in any $GF(2^n)$ field, and that it is assumed that there is only one byte with an error, the remainder is in fact the correction byte.

Packet Mesh Processes

Figure 4:
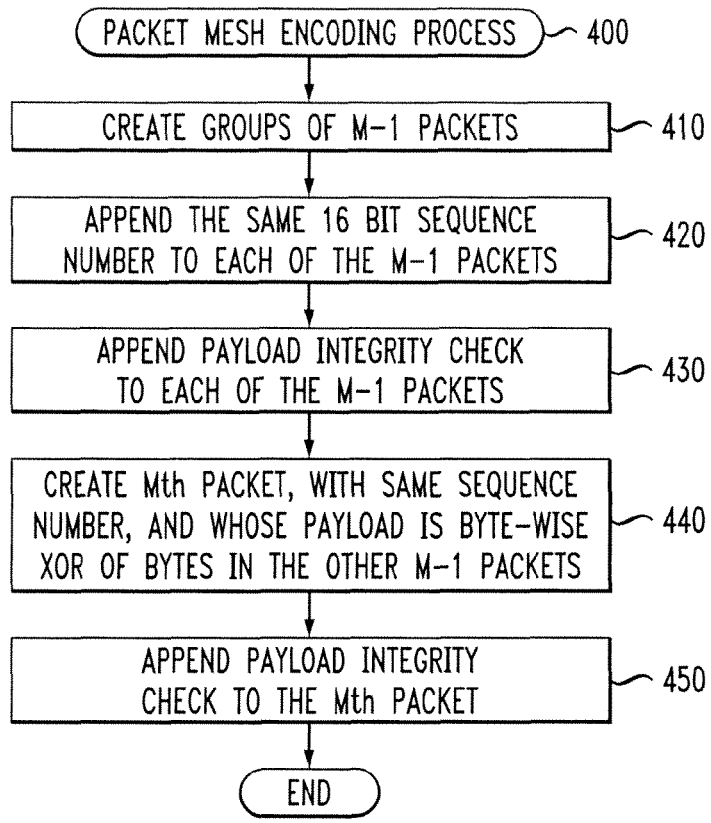
FIG. 4 is a flow chart describing an exemplary implementation of a packet mesh encoding process incorporating features of the present invention.

FIG. 4 is a flow chart describing an exemplary implementation of a GF(256) T=1 packet mesh encoding process 400 incorporating features of the present invention. The exemplary implementation of the packet mesh encoding process 400 creates an M-way mesh. As shown in FIG. 4, the packet mesh encoding process 400 initially creates groups of M-1 packets during step 410 and appends the same 16 bit sequence number (used for packet realignment and reassembly at the receiver) to the M-1 packets, as well as a payload integrity check, such as a cyclic redundancy check, e.g., CRC-32, or an error correcting code. In this manner, the packet is protected against one or more bit errors, and the code is hardened. For example, a systematic Hamming code is especially useful, as a 16 bit version can protect up to 64K byte packets against single bit errors. The appended M-1 packets are referred to as the protection group.

During step 420, an Mth packet is created, with the same sequence number as the previous M-1 packets, and whose payload is the byte-wise XOR of the associated bytes in the M-1 packets. The length of this Mth packet will be equal to the longest packet in the group, with shorter packets having implicit zero-padding on the end.

Figure 5:
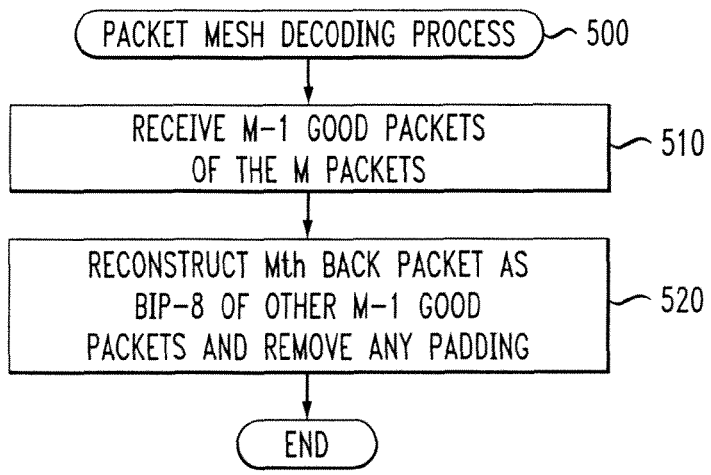
FIG. 5 is a flow chart describing an exemplary implementation of a packet mesh decoding process incorporating features of the present invention.

FIG. 5 is a flow chart describing an exemplary implementation of a GF(256) T=1 packet mesh decoding process 500 incorporating features of the present invention. As shown in FIG. 5, the exemplary packet mesh decoding process 500 is initiated during step 510 upon receipt of M-1 good packets of the M transmitted packets. Thereafter, during step 520, the packet mesh decoding process 500 reconstructs, if necessary, the Mth bad (or missing) packet as the Bit Interleaved Parity (BIP-8) of the other M-1 good packets, and removes any padding at the end (it is assumed that the original packet contains length information).

It is noted that while the present invention is illustrated in FIGS. 4 and 5 using a software implementation, the present invention could also be employed using hardware techniques, or a combination of the foregoing, as would be apparent to a person of ordinary skill in the art.

Example

Consider 4 bytes A, B, C, D that must be protected. The packet mesh encoding process 400 creates a 5th byte E equal to A+B+C+D, where the addition is GF(256) (i.e., byte-wise XOR).

Assume that the receiver receives the five bytes plus an error, e, in byte B. The packet mesh decoding process 500 calculates the error as:

$$\begin{aligned}\text{Error} &= A_R + B_R + C_R + D_R + E_R \quad (5)\\ &= A + (B+e) + C + D + E \\ &= (A+B+C+D) + E + e \\ &= e\end{aligned}$$

since E=A+B+C+D and E+E=0.

Figure 6:
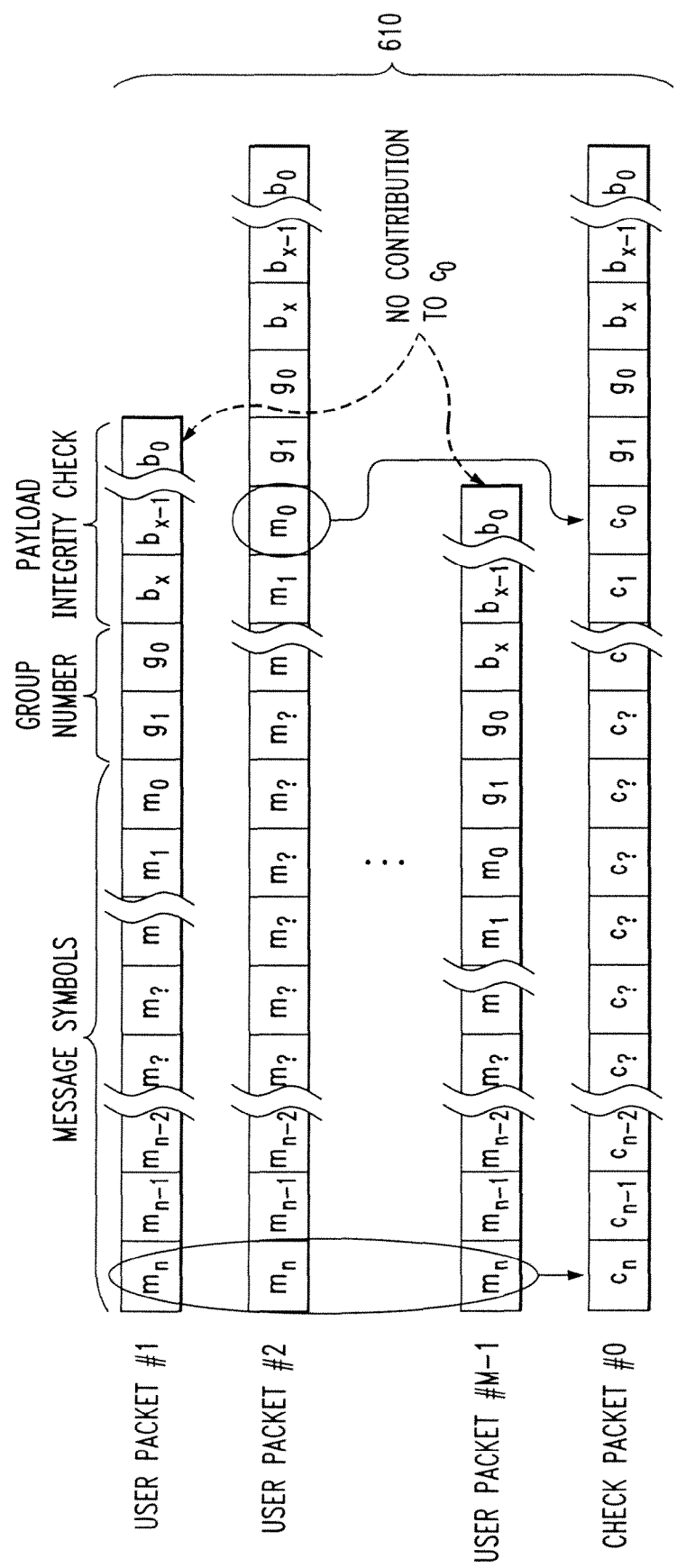
FIGS. 6 and 7 illustrate the generation of a protection group in accordance with the present invention having one and two protection packets, respectively.

FIG. 6 illustrates the generation of a protection group 610 in accordance with the present invention having one protection packet (T=1). As shown in FIG. 6, M-1 user data packets 1 through M-1 (each comprised of a plurality of symbols) are assembled. The user data packets 1 through M-1 and single protection (check) packet 0 form a protection group 610. A group number (i.e., a sequence number) that identifies the protection group 610 and a payload integrity check are added to the user and check packets in the group 610. As shown in FIG. 6, each symbol in the check packet 0 is formed from corresponding symbols in the user packets 0 through M-1 in the group 610. For example, if a GF(256) code is employed, each symbol is eight bits (i.e., one byte). It is noted that the check packet bytes are computed only over the message symbols. In other words, the group number and payload integrity check are not used to compute the bytes of the message symbols in the check packet. The check packet 0 is equal to the longest user packet in the group 610. For shorter user packets, zero is assumed if there are no user symbols.

Figure 7:
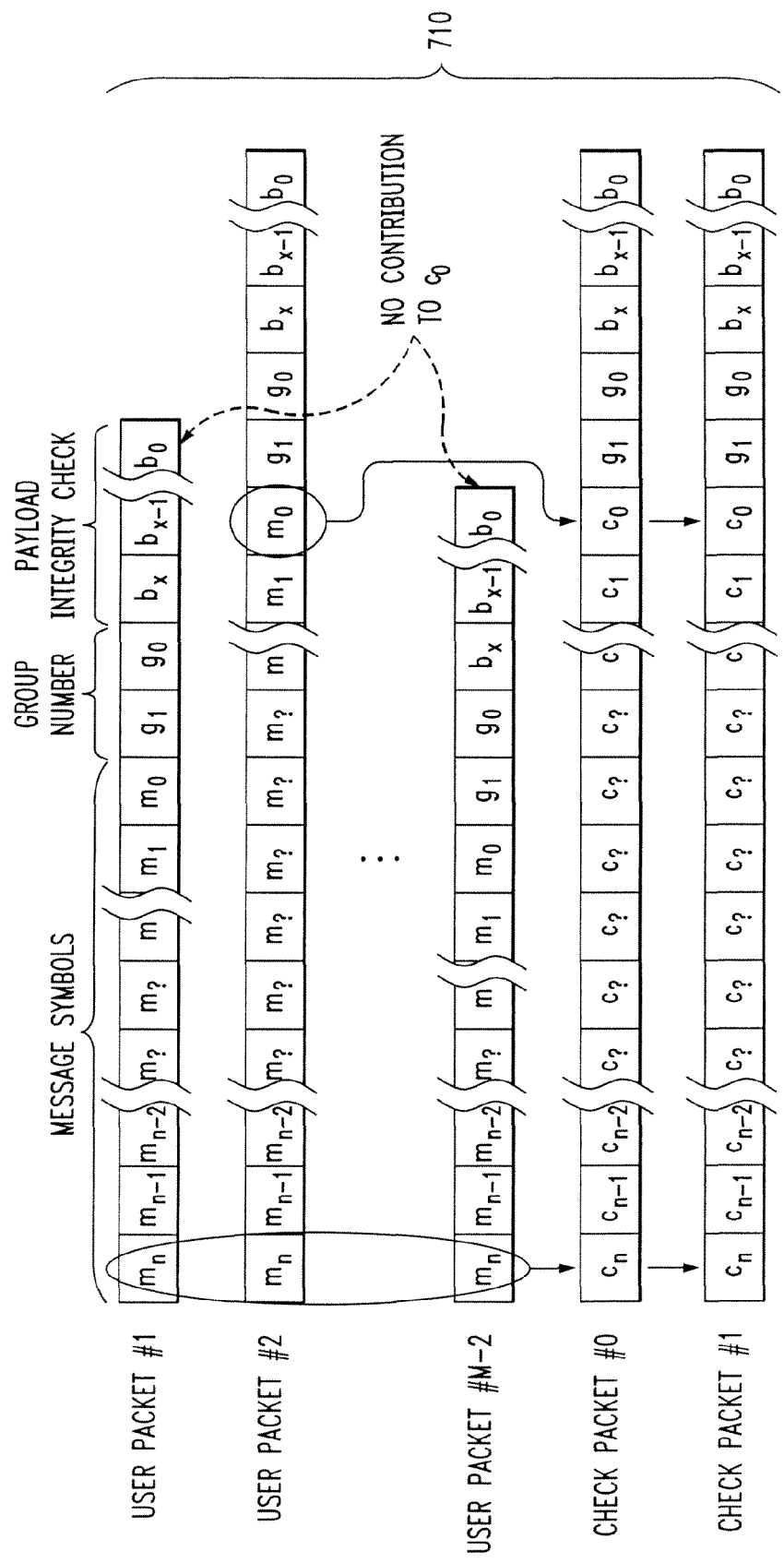

FIG. 7 illustrates the generation of a protection group 710 in accordance with the present invention having two protection packets (T=2). As shown in FIG. 7, M-2 user data packets 1 through M-2 (each comprised of a plurality of symbols) are assembled. The user data packets 1 through M-1 and two protection (check) packets 0 and 1 form a protection group 710. A group number (i.e., a sequence number) that identifies the protection group 710 and a payload integrity check are added to the user and check packets in the group 710. As shown in FIG. 7, each symbol in the check packets 0 and 1 are formed from corresponding symbols in the user packets 1 through M-2 in the group 710. For example, the check packets 0 and 1 can be computed using a 2-stage LFSR.

The present invention applies to arbitrary Galois fields and binary extension Galois fields. For T=N, in a arbitrary Galois Field, the N check packets are the check bytes from the corresponding block erasure code calculated on a symbol-by-symbol basis over the associated symbols in the M-N user packets. For T=1, in a arbitrary Galois Field, the check packet is calculated as the sum (using the appropriate Galois Field addition) on a symbol-by-symbol basis over the associated symbols in the M-1 user packets.

For T=1, in a binary extension Galois Field (i.e. GF($2^n$)), the check packet is calculated as the byte-wise XOR (also called BIP-8) on a byte-by-byte basis over the associated bytes in the M-1 user packets. It is noted that addition in GF($2^n$) is a symbol-wise XOR. The symbol-wise XOR can only be used to produce the check bytes and correction bytes for T=1. For T>1, it must be calculated using the appropriate LFSR (containing T flops) to divide the codeword by the generator polynomial.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention. For example, while the present invention has been primarily illustrated herein using a single protection packet, the present invention may be extended to include T=N codes, with N protection packets, as would be apparent to a person of ordinary skill in the art.

I claim:

1. An error correction decoding method, comprising:
  receiving a plurality of error-free packets and one or more packets having an error; and
  reconstructing said one or more packets having an error by applying block erasure decoding to said plurality of error-free packets, whereby one packet having an error can be reconstructed for each protection packet used to encode said received packets wherein each of T protection packets corresponds to M-T data packets in an M-way mesh, wherein each of said T protection packets comprises payload symbols, and wherein each of said payload symbols is generated from a corresponding location in said M-T data packets.

2. The method of claim 1, wherein said block erasure decoder is a Bit Interleaved Parity (BIP-8) or byte-wise exclusive OR function.

3. The method of claim 1, further comprising the step of removing any padding at the end of said plurality of packets.

4. An error correction decoder, comprising:
  a memory; and
  at least one processor, coupled to the memory, operative to:
  receive a plurality of error-free packets and one or more packets having an error; and
  reconstruct said one or more packets having an error by applying a block erasure decoder to a said plurality of error-free packets, whereby one packet having an error can be reconstructed for each protection packet used to encode said received packets, wherein each of T protection packets corresponds to M-T data packets in an M-way mesh, wherein each of said T protection packets comprises payload symbols, and wherein each of said payload symbols is generated from a corresponding location in said M-T data packets.

5. The error correction decoder of claim 4, wherein said block erasure decoder is a bytewise exclusive OR or BIP-8.

6. The error correction decoder of claim 4, further comprising the step of removing any padding at the end of said M packets.

* * * * *